United States Patent
Park (10) Patent No.: US 8,060,622 B2
(45) Date of Patent: Nov. 15, 2011

(54) SYSTEM AND METHOD FOR SESSION REESTABLISHMENT BETWEEN CLIENT TERMINAL AND SERVER

(75) Inventor: Jee-Hoon Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 430 days.

(21) Appl. No.: 12/338,707

(22) Filed: Dec. 18, 2008

(65) Prior Publication Data
US 2009/0171977 A1   Jul. 2, 2009

Related U.S. Application Data

(62) Division of application No. 11/023,269, filed on Dec. 27, 2004, now Pat. No. 7,693,999.

(30) Foreign Application Priority Data

Jan. 30, 2004  (KR) .................................. 6351/2004

(51) Int. Cl.
*G06F 15/16* (2006.01)
(52) U.S. Cl. ..................................................... 709/227
(58) Field of Classification Search ........... 709/227–229
See application file for complete search history.

(56) References Cited

U.S. PATENT DOCUMENTS

| | | | |
|---|---|---|---|
| 6,640,241 B1 | 10/2003 | Ozzie et al. | |
| 6,643,701 B1 | 11/2003 | Aziz et al. | |
| 7,043,538 B2 * | 5/2006 | Guedalia et al. | 709/220 |
| 7,107,348 B2 | 9/2006 | Shimada et al. | |
| 7,149,310 B2 | 12/2006 | Sandhu et al. | |
| 7,533,145 B1 * | 5/2009 | Greenspan et al. | 709/204 |
| 2002/0143971 A1 * | 10/2002 | Govindarajan et al. | 709/230 |
| 2002/0194473 A1 | 12/2002 | Pope et al. | |
| 2003/0005342 A1 | 1/2003 | Thomas et al. | |
| 2003/0084165 A1 * | 5/2003 | Kjellberg et al. | 709/227 |
| 2003/0217096 A1 * | 11/2003 | McKelvie et al. | 709/202 |

(Continued)

FOREIGN PATENT DOCUMENTS
EP   1 303 102   4/2003
(Continued)

OTHER PUBLICATIONS

Akihiko Kawaguchi et al.: A Digest Making Method for Helping Users to Join to Teleconference From Halfway, vol. 42, No. 12, Dec. 15, 2001.

(Continued)

*Primary Examiner* — Larry Donaghue
(74) *Attorney, Agent, or Firm* — The Farrell Law Firm, P.C.

(57) ABSTRACT

Disclosed is a system and a method for session reestablishment between a client terminal and a server for a messenger service. In a session reestablishment system including a client terminal capable of accessing a communication network, a session information database and a server for providing a messenger service to the client terminal, the client terminal sends a synckey exchanged and stored during previous access to the server when sending a request for session reestablishment (reaccess) to the server after lapse of a predetermined time period from termination of the previous access due to log-off or timeout. The server searches the session information database to detect last session information corresponding to the client terminal based on the synckey, compares the last session information with current session information to detect any updated data, and sends only the updated data to the client terminal.

6 Claims, 6 Drawing Sheets

U.S. PATENT DOCUMENTS

2004/0218762 A1 11/2004 Le Saint et al.
2005/0086376 A1 4/2005 Park et al.

FOREIGN PATENT DOCUMENTS

| | | |
|---|---|---|
| JP | 10-207749 | 8/1998 |
| JP | 2001-092781 | 4/2001 |
| JP | 2003-178016 | 6/2003 |
| JP | 2005-500615 | 1/2005 |
| KR | 1020050037197 | 4/2005 |
| WO | WO 03/017089 | 2/2003 |

OTHER PUBLICATIONS

Satoru Fujii et al., Development of a Group Learning System with Chatting Tool and Blackboard, Technical Report of IEICE, Oct. 2001.

Parviainen et al., "Mobile Instant Messaging", 2003 IEEE, pp. 425-430.

Campbell et al., "Instant Message Sessions in Simple", Internet Engineering Task Force, May 22, 2003.

* cited by examiner

SYSTEM AND METHOD FOR SESSION REESTABLISHMENT BETWEEN CLIENT TERMINAL AND SERVER

PRIORITY

This application is a Divisional Application of U.S. patent application Ser. No. 11/023,269, filed on Dec. 27, 2004 now U.S. Pat. No. 7,693,999, which claims priority to an application entitled "System and Method for Session Reestablishment Between Client Terminal and Server" filed with the Korean Intellectual Property Office on Jan. 30, 2004 and assigned Serial No. 2004-6351, the contents of which are incorporated herein by reference.

BACKGROUND OF THE INVENTION

1. Field of the Invention

The present invention relates to a system and a method for establishing a session between a client terminal and a server, and more particularly to a system and a method for reestablishing a session for a messenger service between a client terminal and a server.

2. Description of the Related Art

During communication with a server, a client terminal may be abruptly disconnected due to a normal or an abnormal off, such as log-off or timeout. In such an event, it is necessary to reestablish a session between the client terminal and the server.

Figure 1:
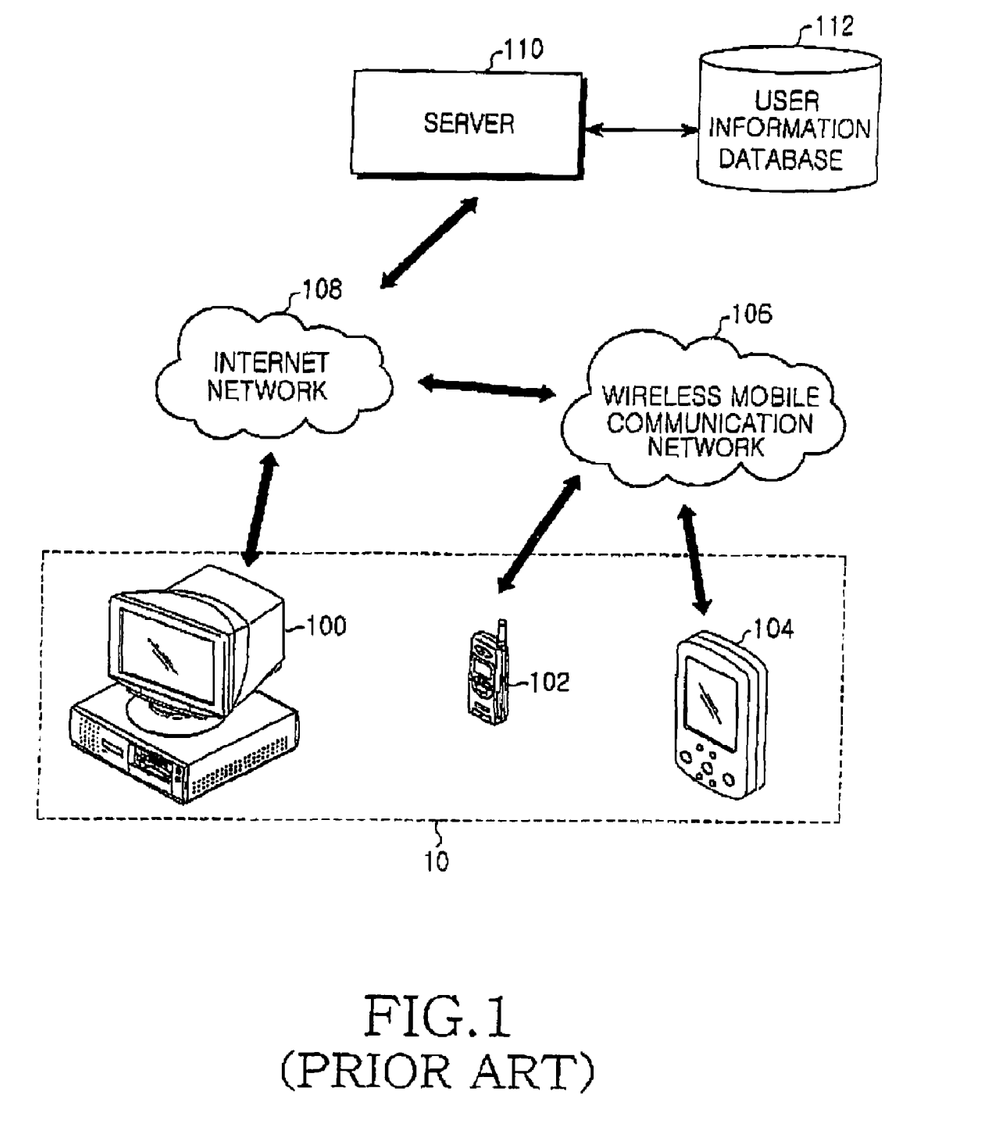
FIG. 1 is a view showing the structure of a conventional system for communication between a client terminal and a server.

FIG. 1 is a view illustrating the structure of a conventional system for communication between a client terminal and a server.

In FIG. 1, reference numeral 10 refers to client terminals. As shown in FIG. 1, a personal computer 100 connected to a server 110 through an Internet network 108, as well as a mobile phone 102 and a PDA (Personal Data Assistant) 104 connected to the server 110 through a wireless mobile communication network 106, can be client terminals. All other terminals capable of receiving a messenger service are also included within the scope of client terminals.

When any client terminal 10 sends a request for login, the server 110 determines whether the client terminal 10 is an effective user and, if it is an effective user, sends a reply with a new session ID to the client terminal 10. Subsequently, the client terminal 10 receives a friend list (or a contact list) and presence information about the listed friends (i.e., other users) from the server 110. The presence information includes the status (e.g., online or offline), addresses, and other contact data, such as telephone numbers, of the listed friends.

Messenger services offered to the users through client terminals vary according to the messenger service providers. Such services include a Yahoo messenger service.

The server 110 connected to the client terminals 10 through the Internet network, provides a messenger service upon a demand from the client terminally. The server 110 has a user information database that includes a friend list of each client terminal user, online or offline status (of the listed friends) and, address and other contact data of each listed friend (e.g., a telephone number of each listed friend).

Figure 2:
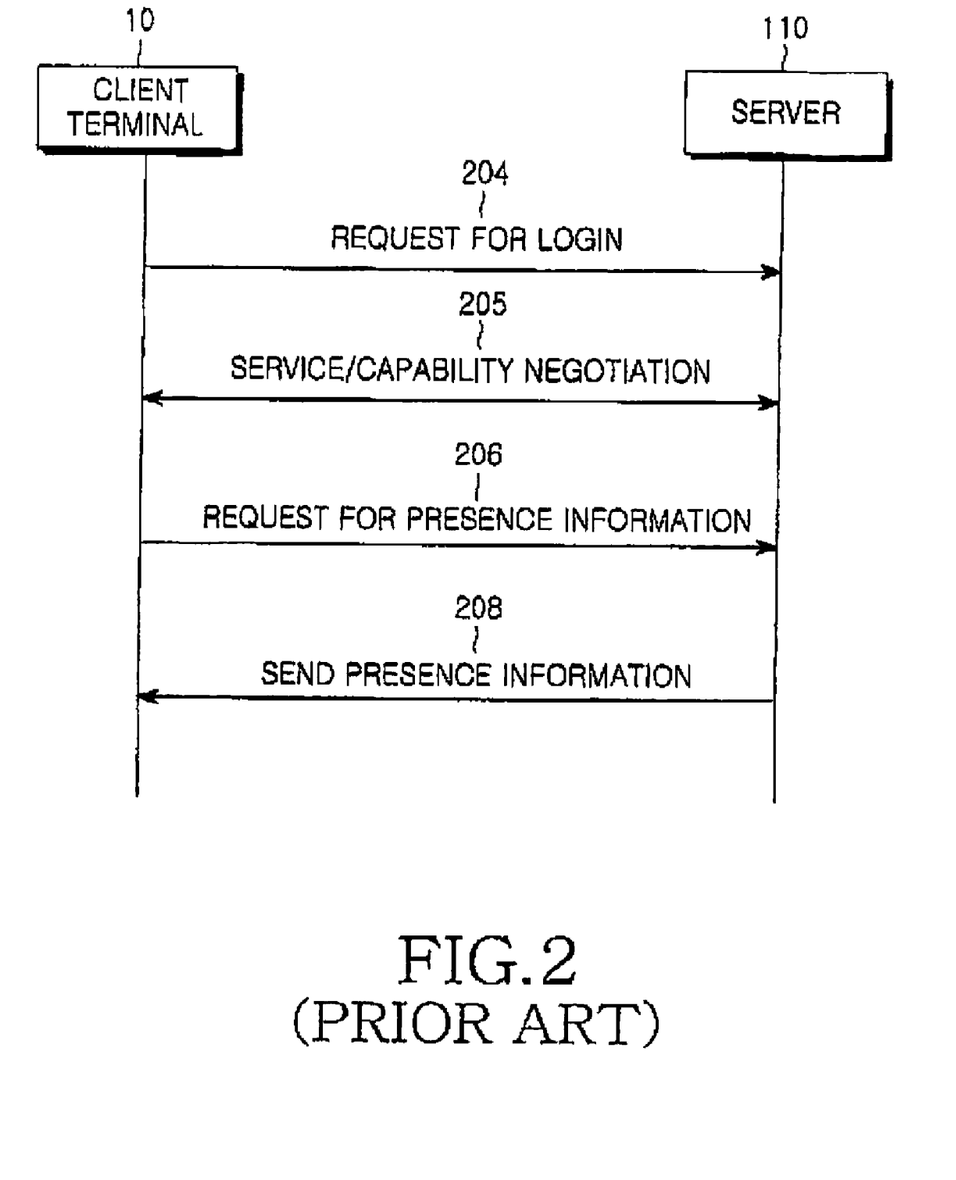
FIG. 2 is a flow diagram showing a conventional process of session reestablishment between a client terminal and a server.

FIG. 2 is a flow diagram showing a conventional process of session establishment between a client terminal and a server.

When a user inputs a demand for messenger service, the user's client terminal 10 sends a request for login to the server 110 at step 204. Upon receiving the login request, the server 110 checks whether the client terminal 10 is an effective user and sends a new session ID to the client terminal 10. The client terminal 10 and the server 110 perform a service negotiation and a capability negotiation to send or receive information necessary to log in, such as a service to be used and the capability of the client terminal 10 at step 205. The client terminal 10 then sends a request for presence information to the server 110 in step 206. Then the client terminal 10 receives a friend list and presence information of the listed friends (other users) from the server 110 in step 208. The presence information includes the online or offline status, addresses, and other contact data, such as telephone numbers, of the listed friends.

However, during the session establishment, unnecessary data may be transmitted, thereby increasing traffic and consequently, consuming time. Accordingly, there is a need for an improvement of the conventional session establishment system and method.

It is assumed that the communication between the server 110 and a user's client terminal 10 was terminated normally or abnormally at 3:00 p.m. and that the client terminal 10 tries to access the server 110 again at 4:00 p.m. Since one hour lapsed after termination of the previous access, the session information (including the type of service offered to the user, capability of the client terminal, presence information of other users in the friend list and exchanged messages) possessed by the client terminal 10 one hour earlier may have been changed. Therefore, the client terminal 10 checks all relevant data received from the server 110 to confirm whether the session information is still effective. Even unchanged data is checked at this time. In other words, if the session information stored in a session information database 112 at 3:00 p.m. has not been changed until 4:00 p.m., the client terminal 10 will request all session information again at 4:00 p.m. Also, the server 110 will send all the previous session information which was provided an hour earlier in response to the request of the client terminal 10. This procedure is inefficient in terms of data traffic and time.

Since the client terminal 10 does not store session information when terminating its access to the server 110, it has to receive all the data of the previous session information from the server 110 when reaccessing the server 110. Even if the session information available at the next access is identical to that used at the previous access or has few updated items, the client terminal 10 receives all relevant data from the server 110, which causes unnecessary data traffic and consumes time.

SUMMARY OF THE INVENTION

Accordingly, the present invention has been made to solve the above-mentioned problems occurring in the prior art, and an object of the present invention is to provide a system and a method for performing a session reestablishment which efficiently uses time and controls traffic flow by enabling a server to send only updated data in session information which had been provided during previous access when a client terminal reaccesses the server.

In order to accomplish the above object of the present invention, there is provided a session reestablishment system including a client terminal capable of accessing a communication network, a session information database, and a server for providing a messenger service to the client terminal, wherein said client terminal sends a synckey exchanged and stored during previous access to the server when sending a request for session reestablishment (reaccess) to the server after lapse of a predetermined time period from termination of the previous access due to log-off or timeout; and wherein said server searches the session information database to detect last session information corresponding to the client terminal based on the synckey, compares the last session information with current session information to detect any updated data, and sends only the updated data to the client terminal.

In accordance with another aspect of the present invention, there is provided a method for session reestablishment in a system including a client terminal and a server for providing a messenger service to the client terminal, said method including: a client terminal sending a request for session reestablishment (reaccess) including a synckey to a server in order to receive a messenger service; the server's receiving the request for session reestablishment and comparing last session information stored right before termination of the previous access with current session information to detect any updated data; the server's sending the detected updated data to the client terminal; and the client terminal's receiving the updated data and updating the session information (or corresponding data in the session information) stored right before termination of the previous access.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described with reference to the accompanying drawings. In the drawings, the same element, although depicted in different drawings, will be designated by the same reference numeral or character. Although certain features (such as various data forming presence information) are specifically defined in the following description of the present invention, it will be obvious to those skilled in the art that such definitions of elements are merely to improve understanding of the present invention and that the present invention can be carried out without such specific features. In addition, in the following description of the present invention, a detailed description of known functions and configurations incorporated herein will be omitted when it may make the subject matter of the present invention unclear.

According to the present invention, a client terminal requests a session reestablishment using the same synckey as used during previous access to a server.

Figure 3:
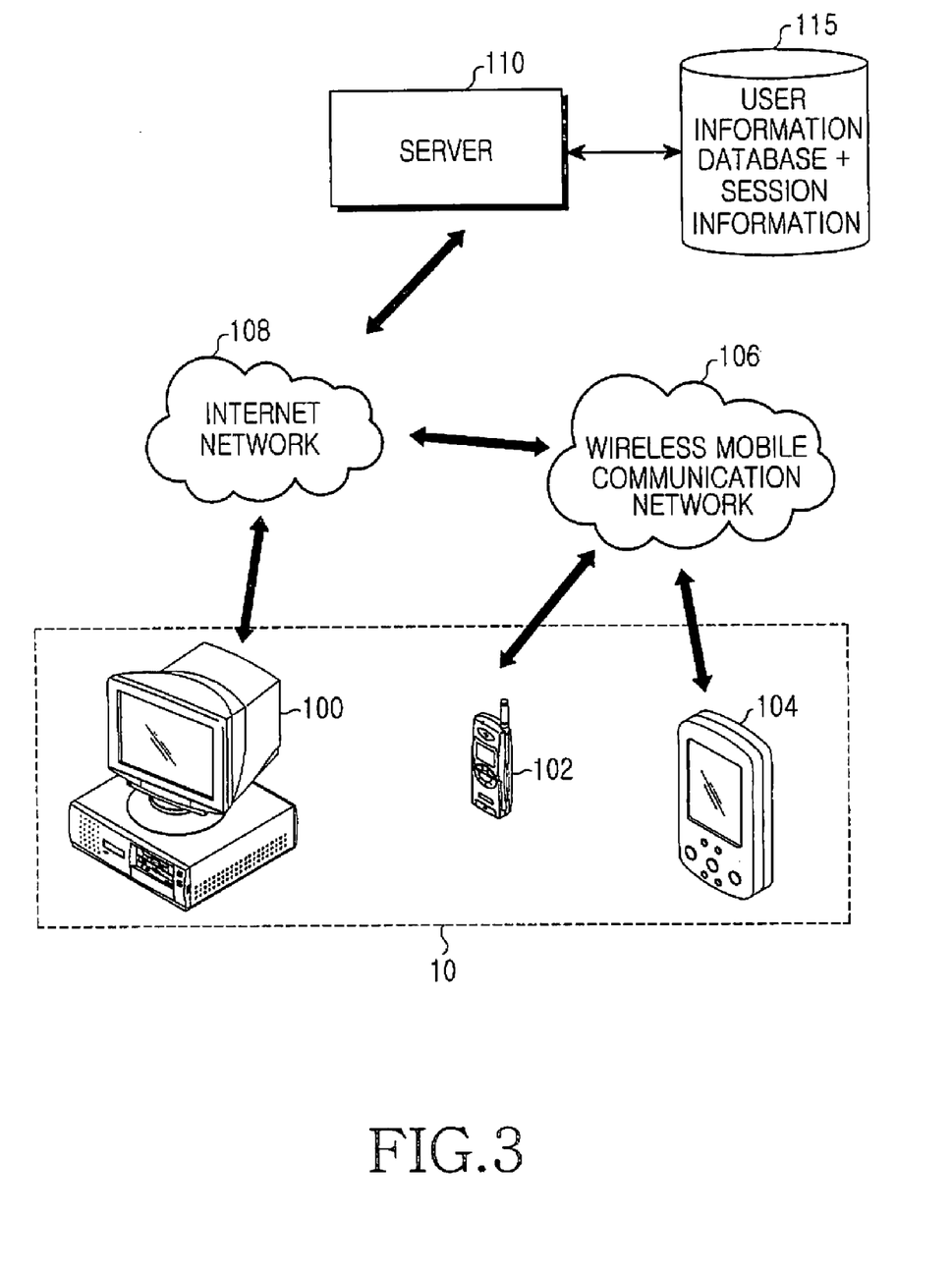
FIG. 3 is a view showing the structure of a system for communication between a client terminal and a server according to the present invention.

FIG. 3 shows the structure of a system for communication between a client terminal and a server according to the present invention.

As compared with the conventional system in FIG. 1, the system illustrated in FIG. 3 further includes a user information database 115 for storing each user's previous session information. The previous session information refers to all previous information relating to a session, such as service types offered upon negotiation and agreement between the server and each client terminal, capability of the client terminal, presence attribute values, and instant messages. Presence attributes indicate the address, status, telephone number, etc. of each user (for example, Gil-Dong Hong in the friend list). The presence attribute values are detailed information (for example, address of 110-2, Myeongryun-dong 4-ga, Jongro-gu, Seoul, online status and telephone number of 760-4930). However, for explanatory convenience, the presence attributes and the presence attribute values are commonly termed "presence information" herein.

Figure 4:
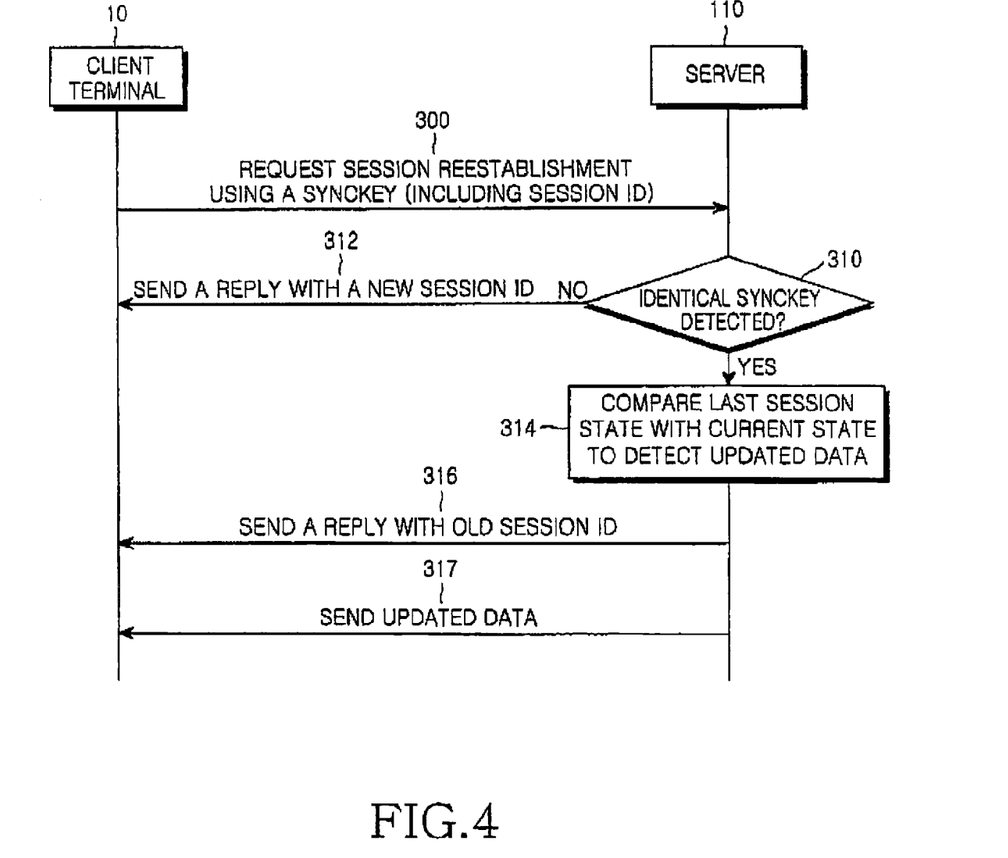
FIG. 4 is a flow diagram showing a process of session reestablishment between a client terminal and a server according to the present invention.

FIG. 4 is a flow diagram showing a process of session reestablishment between a client terminal and a server according to the present invention.

It is assumed that the client terminal 10 has accessed the server 110 to share session information, including a user's friend list and data (e.g., presence information) on the status of the listed friends, and has then terminated the access.

During access to the server 110, the client terminal 10 and the server 110 exchange and share a session ID and a client ID. When the access is terminated, both the client terminal 10 and the server 110 store an ID for the last successful transaction (i.e., a transaction ID). The last successful transaction means a transaction conducted right before normal termination by logout or connection termination or before abnormal termination due to a connection failure. The session information includes service types used, capability of the client terminal, presence information of the users in the friend list, and exchanged messages.

When the access to the server 110 is terminated, the client terminal 10 stores the latest session information used in the last successful communication with the server 110. Also, the client terminal 10 stores a synckey relating to the session information. The synckey includes a session ID of the previous connection (session) between the client terminal 10 and the server 110, a client ID of the client terminal 10 that stores the friend list and the status of each friend, and a transaction ID of the communication between the client terminal 10 and the server 110. The session ID is provided from the server 110 to the client terminal 10. The client ID is provided from the client terminal 10. The transaction ID is provided by both the client terminal 10 and the server 110. The synckey including the three IDs has already been exchanged in the previous access and is known to the server and the client terminal.

Referring to FIG. 4, when a certain predetermined time has elapsed after the termination of a previous access to the server 110, the client terminal 10 may send a request for session reestablishment (reaccess) to the server 110 using the synckey including the old session ID, in step 300. In other words, the request for session reestablishment includes the synckey.

Upon receiving the request, the server 110 identifies the client terminal 10 and detects the synckey included in the request. Also, the server 110 confirms whether the same synckey is present in the user information database 115 that stores the user's previous session information in step 310. If the same synckey is detected, the server 10 will compare the last session state and the current session state to detect any updated data of session information in step 314. The updated data are, for example, messages newly received or a changed status of the friend list during disconnection.

The server 110 sends a reply for session establishment, including the session ID that was sent to the client terminal 10 at step 300, to the client terminal 10 in step 316. Then, the server 110 sends the updated data to the client terminal 10 in step 317. Moreover, steps 316 and 317 can be performed sequentially or concurrently. Based on the updated data, the client terminal 10 updates the previously stored session information. The above example illustrates a process of session reestablishment when there is updated data. If there is no updated data, the server 110 will only send a reply with the old session ID as included in the synckey to the client terminal 10 at step 316.

The synckey included in the request received from a client terminal 10 is compared with the synckey stored in the user information database. If the same synckey (as received from the client terminal 10) is not detected, the server 110 will send a reply for session establishment, including a new session ID, to the client terminal 10 in step 312. This reply, as a session reestablishment failure message, is identical to the reply sent when session reestablishment is successful, with a difference being that it includes a new session ID and data.

Figure 5:
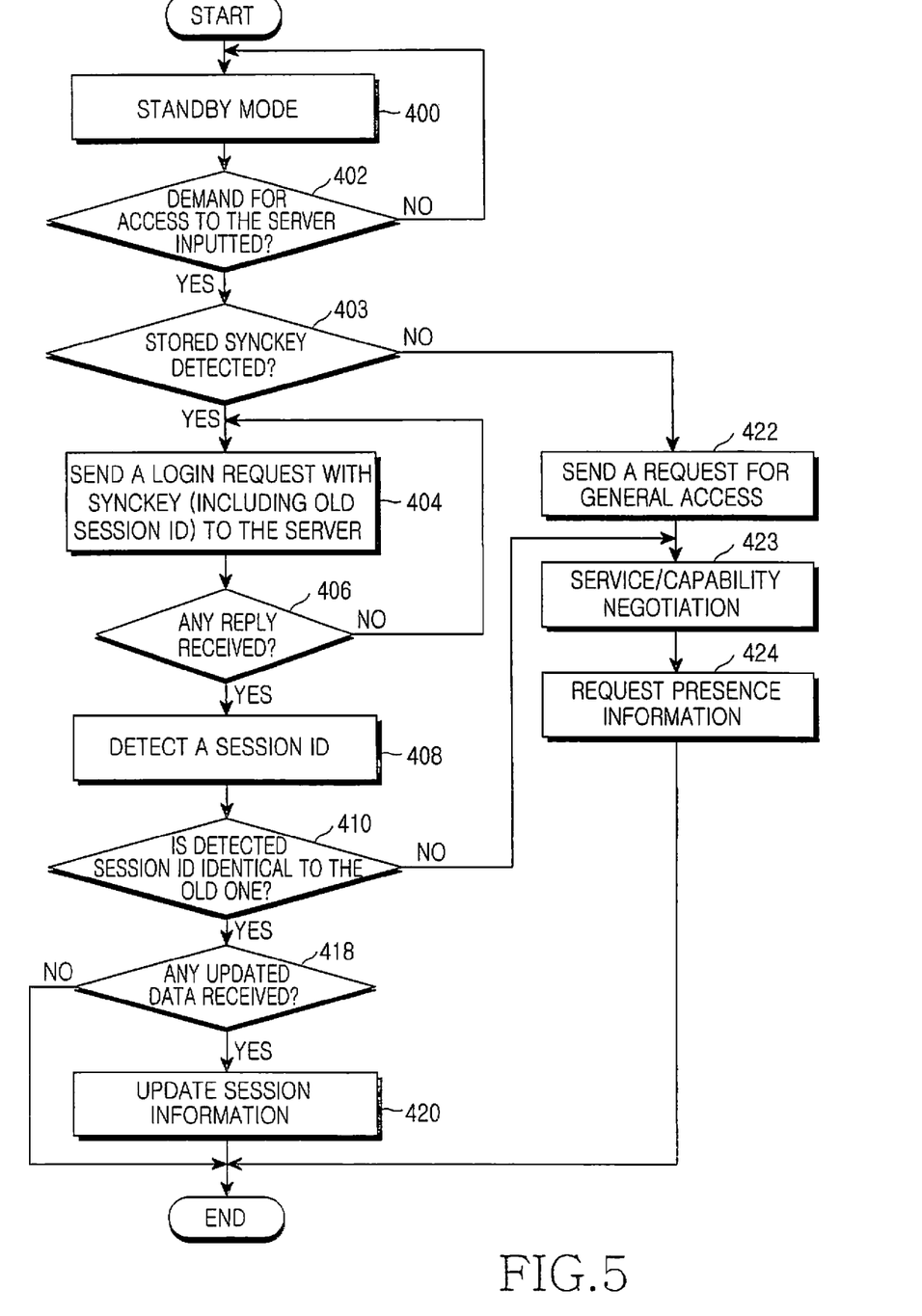
FIG. 5 is a flow chart illustrating operations performed by a client terminal for the session reestablishment according to the present invention.

FIG. 5 is a flow chart showing operations performed by a client terminal for the session reestablishment according to the present invention.

The client terminal 10 is in a standby mode at step 400. The client terminal then proceeds to step 402 where it checks whether the user has inputted a demand for access to the server 110 to receive a messenger service. If there is no input, the client terminal 10 returns to a standby mode in step 400.

If a demand for access is inputted, the client terminal 10 proceeds to step 403 where it determines whether there is a stored synckey. If no synckey is detected, the client terminal 10 sends a request for general access to the server 110 in step 422. In other words, if the client terminal 10 does not store any previous (old) session information, it will send a request for login without including a synckey. After a service/client capability negotiation at step 423, the client terminal 10 sends a request for presence information to the server 110 at step 424. The client terminal 10 then receives current values from the server 110 to complete login. Step 403 and subsequent steps 422 to 424 are generally known in the art. An additional step of receiving user information or requesting a contact list can be performed between steps 423 and 424 and is known in the art, and therefore will not be shown or further explained herein. The contact list refers to a list of the user's contact groups, such as friends, family and colleagues. In the preferred embodiment of the present invention, a friend list is as an example of a contact list.

Steps 410 and 423 are performed when the server 110 sends a new session ID to the client terminal 10. The client terminal 10 compares the new session ID with the old (existing) session ID at steps 410. If the new session ID is not identical to the old one, the client terminal will proceed with step 423.

If a stored synckey is detected at step 403, the client terminal 10 will proceed with step 404 to send a request for session reestablishment (reaccess), including the detected synckey (including the old session ID), to the server 110. The presence of a stored synckey means that a session was previously established between the client terminal and the server.

At step 406, the client terminal 10 checks whether a reply to the request for reaccess is received from the server 110. If a reply is received, the client terminal 10 will proceed with step 408 to detect a synckey, preferably a session ID included in the synckey, from the reply. At step 410, the client terminal 10 determines whether the received session ID is identical to the (old) session ID which was sent to the server 110 at step 404. If the session IDs are identical to each other, the client terminal 10 will check whether any updated data is received from the server 110 at step 418. If updated data is received, the client terminal 10 will proceed with step 420 to update the session information based on the updated data.

Figure 6:
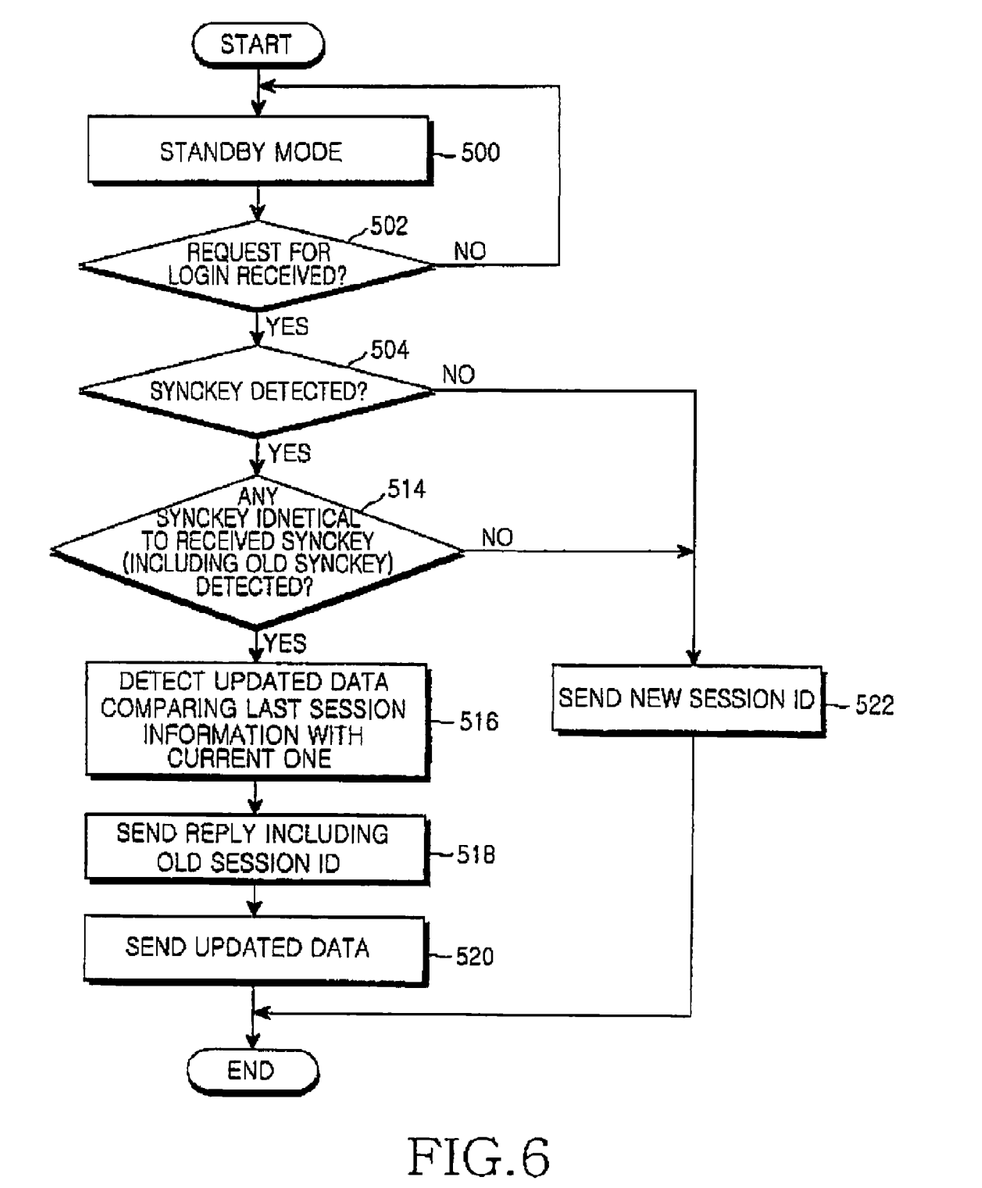
FIG. 6 is a flow chart illustrating operations performed by a server for the session reestablishment according to the present invention.

FIG. 6 is a flow chart showing operations performed by the server for the session reestablishment according to the present invention.

The server 110 in the standby mode at step 500 proceeds to step 502 where it checks whether a request for login has been received from the client terminal 10. If the request for login is received, the server 110 will proceed to step 504 where it determines whether or not there is a stored synckey. If a stored synckey is detected, the server 110 proceeds to step 514 where it determines whether the stored synckey is identical to the synckey that was received from the client terminal 10 (which includes the old session ID). The received synckey was included in the login request sent by the client terminal 10 at step 404 in FIG. 4. The presence of a stored synckey means that a session was previously established between the client terminal 10 and the server 110.

If no synckey is detected at step 504 or if no synckey is determined to be identical to the received synckey at step 514, the server 110 proceeds to step 522 where it sends a new session ID to the client terminal 10. If an identical synckey is detected, the server 110 will send the session ID included in the received synckey to the client terminal 10 in response to the login request and will proceed with step 516. At step 516, the server 110 searches for the last session information from the user database 115 that stores previous session information of each session information user. The server 110 compares the last session information with the current session information to detect any updated data. At step 518, the server 110 sends a reply including the old session ID (the client terminal 10 receives the reply at step 406 in the process shown in FIG. 5). The server 110 then sends the updated data to the client terminal 10 in step 520.

As explained above, when the client terminal 10 requests a session reestablishment, the server 110 sends only data updated during disconnection (after termination of previous access) to the client terminal 10, without sending unchanged data. Thus, an efficient session reestablishment in terms of traffic and time is achieved.

Although preferred embodiments of the present invention have been described for illustrative purposes, those skilled in the art will appreciate that various modifications, additions and substitutions are possible without departing from the scope and spirit of the invention as disclosed in the accompanying claims, including the full scope of equivalents thereof.

What is claimed is:

1. A method for session re-establishment in a server for providing a messenger service between the server and client terminal, comprising the steps of:

receiving a request for session re-establishment for a session from the client terminal after an access of the client terminal to the session is terminated;

detecting a synckey, including a session ID of the session between the client terminal and the server, a client ID of the client terminal and a transaction ID of the communication between the client terminal and the server, from the received request for session re-establishment;

confirming session information on the session stored in the client terminal based on the detected synckey and comparing the confirmed session information to updated session information on the session stored in a database of the server;

detecting updated data, which represents a difference in data between the session information stored in the client terminal and the updated session information, according to a result of the comparison; and sending a reply for requesting session re-establishment including the updated data to the client terminal.

2. The method as claimed in claim 1, wherein the updated data includes messages newly received after the access of the client terminal is terminated and changed status of friends.

3. The method as claimed in claim 1, wherein if a synckey value detected from the session re-establishment received from the client terminal is different from a synckey value stored in the memory, the server generates a new session ID and sends a synckey including the generated new session ID to the client terminal.

4. A server for session re-establishment for providing a messenger service between the server and a client terminal, wherein the server receives a request for session re-establishment for a session from the client terminal after an access of the client terminal to the session is terminated, detects a synckey including a session ID of the session between the client terminal and the server, a client ID of the client terminal and a transaction ID of the communication between the client terminal and the server from the received request for session re-establishment, confirms session information on the session stored in the client terminal based on the detected synckey and compares the confirmed session information to updated session information on the session stored in a database of the server, detects updated data which represents a difference in data between the session information stored in the client terminal and the updated session information, according to a result of the comparison, and sends a reply for requesting session re-establishment including the updated data to the client terminal.

5. The server as claimed in claim 4, wherein the updated data includes messages newly received after the access is terminated, and a changed status of friends.

6. The server as claimed in claim 4, wherein if a synckey value detected from the session re-establishment received from the client terminal is different from a synckey value stored in a memory, the server generates a new session ID and sends a synckey including the generated new session ID to the client terminal.

* * * * *